US009403137B2

(12) United States Patent
Russell et al.

(10) Patent No.: US 9,403,137 B2
(45) Date of Patent: Aug. 2, 2016

(54) POLYCRYSTALLINE DIAMOND MATERIAL WITH EXTREMELY FINE MICROSTRUCTURES

(75) Inventors: William C. Russell, Columbus, OH (US); Susanne Sowers, Dublin, OH (US); Steven Webb, Woodlands, TX (US); Ram Raghavan, Galena, OH (US)

(73) Assignee: Diamond Innovations, Inc., Worthington, OH (US)

( * ) Notice: Subject to any disclaimer, the term of this patent is extended or adjusted under 35 U.S.C. 154(b) by 1995 days.

(21) Appl. No.: 12/406,052

(22) Filed: Mar. 17, 2009

(65) Prior Publication Data

US 2009/0178345 A1 Jul. 16, 2009

Related U.S. Application Data

(63) Continuation-in-part of application No. 11/531,389, filed on Sep. 13, 2006, now abandoned.

(60) Provisional application No. 60/717,227, filed on Sep. 15, 2005.

(51) Int. Cl.
| | |
|---|---|
| *B32B 9/00* | (2006.01) |
| *B01J 3/06* | (2006.01) |
| *B22F 7/06* | (2006.01) |
| *C22C 26/00* | (2006.01) |
| *B22F 5/00* | (2006.01) |

(52) U.S. Cl.
CPC ............ *B01J 3/062* (2013.01); *B22F 7/062* (2013.01); *B32B 9/00* (2013.01); *C22C 26/00* (2013.01); *B01J 2203/062* (2013.01); *B01J 2203/0655* (2013.01); *B01J 2203/0685* (2013.01); *B22F 2005/002* (2013.01); *B22F 2998/00* (2013.01); *Y10T 428/249967* (2015.04); *Y10T 428/26* (2015.01)

(58) Field of Classification Search
CPC .......................................................... B32B 9/00
USPC ........................................ 423/447.1; 428/408
See application file for complete search history.

(56) References Cited

U.S. PATENT DOCUMENTS

| | | | |
|---|---|---|---|
| 3,574,580 A | | 4/1971 | Stromberg et al. |
| 3,831,428 A | | 8/1974 | Wentoft, Jr. et al. |
| 3,936,577 A | * | 2/1976 | Christini et al. ............... 428/614 |
| 4,104,441 A | | 8/1978 | Fedoseev et al. |
| 4,124,401 A | * | 11/1978 | Lee et al. ......................... 501/90 |
| 4,954,139 A | | 9/1990 | Cerutti |
| 5,759,216 A | | 6/1998 | Kanada et al. |

(Continued)

FOREIGN PATENT DOCUMENTS

| | | |
|---|---|---|
| JP | 02-030668 | 1/1990 |
| JP | 07-156003 | 6/1995 |
| JP | 09-316587 | 9/1997 |
| WO | 2004054943 A1 | 7/2004 |
| WO | 2007/020518 | 2/2007 |

OTHER PUBLICATIONS

Anonymous, Chemically Active Cobalt, IP.com No. IPCOM000130391D, IP.com Prior Art Database, Oct. 21, 2005.

*Primary Examiner* — Daniel H Miller

(57) ABSTRACT

A sintered polycrystalline diamond material (PCD) of extremely fine grain size is manufactured by sintering under high pressure/high temperature (HP/HT) processing, a diamond powder which is blended with a pre-milled source catalyst metal compound. The PCD material has an average sintered diamond grain structure of less than about 1.0 µm.

13 Claims, 5 Drawing Sheets

(56) References Cited

U.S. PATENT DOCUMENTS

| | | |
|---|---|---|
| 5,769,176 A * | 6/1998 | Sumiya et al. ............... 175/434 |
| 5,952,102 A | 9/1999 | Cutler |
| 6,196,910 B1 | 3/2001 | Johnson et al. |
| 6,852,414 B1 | 2/2005 | Frushour |
| 2005/0019114 A1 | 1/2005 | Sung |
| 2005/0263944 A1 | 12/2005 | Weis et al. |
| 2006/0042171 A1 * | 3/2006 | Radtke et al. .................. 51/307 |

* cited by examiner

POLYCRYSTALLINE DIAMOND MATERIAL WITH EXTREMELY FINE MICROSTRUCTURES

CROSS-REFERENCE TO RELATED APPLICATIONS

This patent application is a continuation-in-part of co-pending U.S. patent application Ser. No. 11/531,389, filed Sep. 13, 2006 entitled "Sintered, Polycrystalline Diamond Compact with Extremely Fine Microstructures", which claims the benefit of U.S. provisional application No. 60/717,227, filed Sep. 15, 2005 entitled "Sintered, Polycrystalline Diamond Compact with Extremely Fine Microstructures", the disclosures of which are incorporated herein by reference in their entirety.

STATEMENT REGARDING FEDERALLY SPONSORED RESEARCH

Not applicable.

NAMES OF PARTIES TO A JOINT RESEARCH AGREEMENT

Not applicable.

SEQUENCE LISTING

Not applicable.

BACKGROUND

1. Technical Field

The disclosed embodiments generally relate to the field of sintered diamond cutting and forming tools and more particularly to such diamond tools having extremely fine microstructures imparting improved tool properties, machinability, and an ability to impart improved surface finish to workpiece materials.

2. Description of the Related Art

Polycrystalline diamond (PCD) is used extensively in industrial applications including metal cutting, wire drawing, drilling, and as wear parts. As defined herein, PCD is a two phase polycrystalline diamond product in which the diamond crystals are sintered together to form a continuous diamond lattice. This lattice, the majority phase, comprises interparticle diamond-to-diamond bonds without interposed, non-diamond, bonding phases. A volume of residual catalyst metal, the minor phase, may be disposed in interstices between diamond crystals.

PCD production methods were first discovered in the 1960's and are well described in patent literature. U.S. Pat. Nos. 3,831,428; 4,063,909; 5,488,268, the disclosures of each of which are incorporated herein by reference, describe high pressure/high temperature (HP/HT) methods that produce cutting tools, wire drawing dies, and earth boring drilling cutters with resistance to abrasive and chemical wear. Because PCD exhibits more uniform mechanical properties than single crystal diamond and is available in larger sizes than single crystal diamond, PCD offers substantial design advantages over natural or synthetic single crystal diamond.

However, PCD as currently produced, does not provide extremely smooth cut, drawn or otherwise formed workpiece surfaces. Single crystal diamond, while expensive, anisotropic, and limited in size, remains the preferred tool material for single point turning of optical materials or drawing of highly finished, fine wire. Mechanical failure, from limited strength and impact resistance, of PCD tools is also common.

Conventional PCD is formed by infiltrating synthetic diamond grains with a suitable solvent catalyst material under processing conditions of extremely high pressure/high temperature, where the solvent catalyst material promotes desired intercrystalline diamond-to-diamond bonding between the grains, thereby forming a PCD structure. The resulting PCD structure produces enhanced properties of wear resistance and hardness, making PCD materials extremely useful in aggressive wear and cutting applications where high levels of wear resistance and hardness are desired. Solvent catalyst materials typically used for forming conventional PCD include metals from Group VIII of the Periodic table, with cobalt (Co) being the most common.

Available PCD components have parts having diamond grain sizes after HP/HT sintering ("as-sintered") of 1 μm to 100 μm. Finer, uniform, as-sintered diamond grain sizes, for example, of about 0.1 μm to about 1.0 μm (referred to as "submicron") have proven challenging to produce commercially using the PCD manufacturing process described above. Submicron diamond particles are difficult to produce, and have proven difficult to handle during blending and mixing due to their high surface area's ability to attract and retain contaminants that affect the sintering process and product properties.

Submicron diamond particles have low packing densities that cause problems during loading of shielding enclosures and HP/HT processing. The very fine pores between the submicron diamond grains in the initial diamond particle mass are difficult to uniformly penetrate with catalyst metal, leading to incomplete bonding and sintering between diamond particles. It is almost always observed that the high surface area of submicron diamond powders causes the diamond solution-reprecipitation process to occur non-uniformly. This leads to non-uniform detrimental diamond grain growth and other complications that make the production of larger parts unfeasible when final diamond grain sizes less than 1 micron are attempted.

Prior attempts to produce submicron monolithic PCD have not yielded product having any substantial uniformity, either as (i) a monolithic, free-standing body, or (ii) PCD attached to a substrate, known as supported PCD. PCD, as used herein, refers to a sintered PCD body that is comprised of a continuous diamond matrix, diamond to diamond bonds, with or without catalyst metal. PCD is generally a two-phase material (diamond and catalyst), and may contain a minority third phase interposed between diamond grains, such as bonding carbides, nitrides, or borides.

Due to the difficulty of catalyst penetrating a bed of very fine, submicron diamond particles, the dispersion of the catalyst tends to become non-uniform. This affects the uniformity of the sintering process resulting in poorly sintered zones. Internal stresses that arise due to the composite two-phase nature of the body also distribute non-uniformly throughout the PCD and this results in cracking.

U.S. Pat. No. 4,303,442 to Hara et al., the disclosure of which is incorporated herein by reference, describes a method to sinter diamond materials for a cutting tool or wire die in which the grain size of the diamond is less than 1 μm. Hara et al. discusses the benefits of submicron grain structure in providing high dimensional precision and superb surface finish on workpieces. In order for Hara et al. to produce useful sintered diamond tools, it was necessary to add a third phase of one or more carbides, nitrides, and borides of IVB, VB, VIB group metals (otherwise known as International Union of Pure and Applied Chemistry (IUPAC) Group 4, Group 5, and Group 6 elements, respectively) together with an iron group catalyst metal to the submicron diamond particles.

Additionally, Hara et al. teaches the difficulty of producing submicron PCD. Example 1 of Hara et al. shows that submicron diamond powders with less than 5% of the bonding additions undergo grain growth to over 300 µm diameters during HP/HT sintering. These non-uniform materials were not hard enough to be useful as cutting tools.

There remains a need to produce a monolithic PCD material with uniform, as-sintered, diamond grains sizes below 1 µm. Surprisingly, applicants have found a method, utilizing a cobalt oxalate dihydrate as the source catalyst metal compound, to achieve several of the advantages of submicron PCD.

The disclosure contained herein describes attempts to address one or more of the problems described above.

SUMMARY

An exemplary embodiment includes a method for producing a polycrystalline diamond (PCD) body having an average as-sintered grain size less than about 1.0 µm by: starting with diamond particles having a mean volumetric particle size less that about 1.0 µm; blending, with the diamond particles, a source catalyst metal compound having an arithmetic mean particle size that is less than or up to about the size of the diamond grain size to form a diamond powder blend; and processing the diamond powder blend using a pressure and a temperature for a time sufficient to affect intercrystalline bonding between adjacent diamond particles.

In an embodiment, the source catalyst metal compound may be selected from Group VIII elements of the Periodic table and chromium, tantalum and manganese and/or compounds of their alloys and/or hydrates of the compounds thereof, oxides, acetates, citrates, hydroxides or other organometallic compounds of iron group metals. In yet another embodiment, the source catalyst metal compound may be cobalt oxalate dihydrate, cobalt acetate, cobalt boride, cobalt citrate dihydrate, cobalt hydroxide, cobalt isopropoxide, cobalt pentanedionate, cobalt oxide, dodecacarbonyltetracobalt and combinations thereof.

In an embodiment, the source catalyst metal compound may be reduced to metal by a pre-sintering heating process. The resulting reduced catalyst metal may be about 0.5% to about 15% by weight of the diamond powder blend. The diamond powder blend is then processed using a pressure and a temperature for a time sufficient to affect intercrystalline bonding between adjacent diamond particles. The processing pressure of the diamond powder blend may be between about 20 Kbar and about 80 Kbar. The processing temperature may be at least about 1000° C., and the processing time may be between about 3 minutes to about 120 minutes.

In an embodiment of the method, the processing further includes inclusion of a cemented metal carbide support with the diamond powder blend. A further embodiment uses a metal cemented carbide support in the shape of an annulus, with the diamond powder blend disposed within the support annulus.

In another embodiment, the polycrystalline (PCD) body has diamond crystals that have an arithmetic mean, as-sintered diamond grain size less than 1 µm. In another embodiment, the PCD body comprises grain sizes greater than about 0.1 µm and less than about 1.0 µm. In still another embodiment, the as-sintered grain size of a PCD body is substantially uniform. In a further embodiment, the PCD body is monolithic.

A PCD body embodied herein may have diamond crystals wherein at least 63% of the crystals have a grain size that is less than 1.0 µm. Another embodiment is a PCD body which has a mean as-sintered grain size between about 0.1 µm and 1.0 µm, with a body thickness greater than about 0.5 mm.

Still another embodiment includes a polycrystalline diamond (PCD) wear component, such as, but not limited to, a machining tool, wear pad, punch, or die, comprising a PCD body that has a mean as-sintered diamond grain size between about 0.1 µm and about 1.0 µm. In another embodiment of the tool, the PCD body is monolithic. In yet another embodiment of the tool, the PCD body is bonded to a substrate, and the substrate may be cemented metal carbide, such as for example, but not limited to, cemented tungsten carbide.

DETAILED DESCRIPTION

Figure 1:
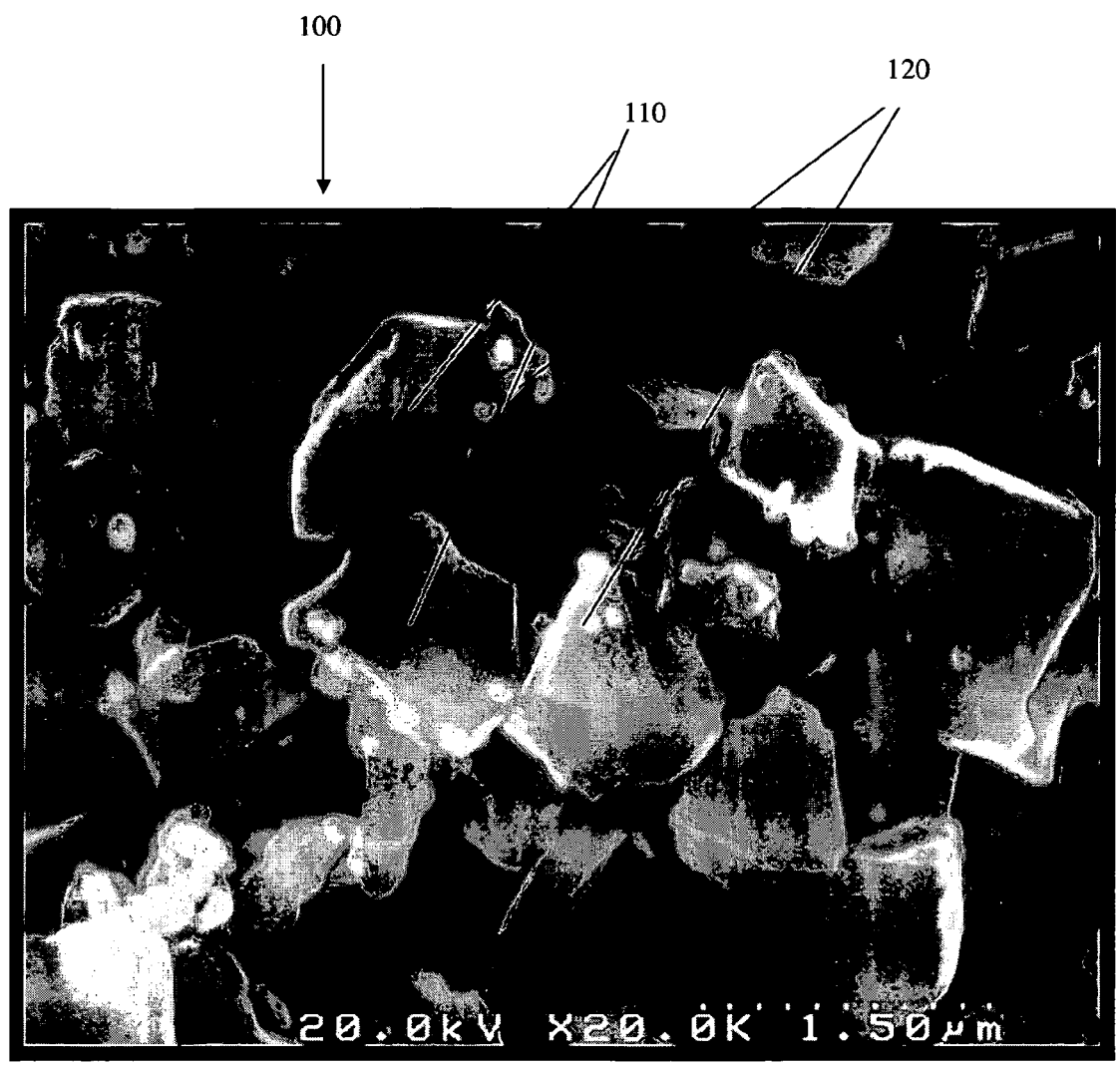
FIG. 1 is a scanning electron microscope ("SEM") image of an exemplary cobalt-diamond powder blend of the present invention.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise.

In addition, the word "comprising" as used herein is intended to mean "including but not limited to." Further, the word "HP/HT" refers to the processing of a material at high pressures (i.e., between 20 Kbar and 80 Kbar or higher) and high temperature (i.e., about 1000° C. or higher). The word "source catalyst metal compound" refers to the catalyst that is added to the diamond powder blend prior to reduction of the catalyst. The word "reduced catalyst" refers to the catalyst after reduction (thermal, chemical, etc.) of the catalyst. Unless defined otherwise, all technical and scientific terms used herein have the same meanings as commonly understood by one of ordinary skill in the art.

In an embodiment, a body is made of submicron polycrystalline diamond ("PCD"), that is, a metal catalyzed sintered diamond product having a sintered arithmetic mean (i.e., average) diamond grain size below 1 µm and above 0.1 µm.

Average sintered grain size was determined using the line-intercept method. This method is based on the grain dimension determined through the intersection of randomly drawn lines on a microstructure photo, and is familiar to those skilled in the art.

Using a diamond powder with a pre-blended source catalyst metal compound, such as cobalt oxalate dihydrate, a method embodiment may produce high quality PCD with average as-sintered grain sizes from about 0.1 μm to about 1.0 μm.

Diamond Powder Blend. The raw material diamond particles may be natural or HP/HT synthetic single crystal particles or polycrystalline aggregates with a submicron particle size, between about 0.1 μm and about 1.0 μm. The raw material diamond particle size is the volumetric mean particle size measured by a particle size analyzer such as a Microtrac or any other suitable analyzer. In one embodiment, the mean volumetric particle size of the diamond particles is about 0.8 μm. In another embodiment the mean volumetric particle size is about 0.5 μm. In a third embodiment, particles of about 0.3 μm mean volumetric particle size are effectively sintered.

The diamond powder blend further contains one or more source catalyst metal compounds selected from known catalysts. Examples of such source catalyst metals include those discussed in U.S. Pat. Nos. 2,947,609 and 2,947,610 which are herein incorporated by reference. Useful source catalyst metals include Group VIII elements of the Periodic table and chromium, tantalum and manganese and/or compounds of their alloys and/or hydrates of the compounds thereof, oxides, acetates, citrates, hydroxides or other organometallic compounds of iron group metals. Source catalyst metal compounds may also include cobalt oxalate dihydrate, cobalt acetate, cobalt boride, cobalt citrate dihydrate, cobalt hydroxide, cobalt isopropoxide, cobalt pentanedionate, cobalt oxide, dodecacarbonyltetracobalt, cobalt or other iron group metals and combinations thereof. Source catalyst metal compounds are available from chemical suppliers such as Alfa Aesar (Ward Hill, Mass.), Sigma Aldrich (St. Louis, Mo.), or Fisher Scientific (Waltham, Mass.).

In an embodiment, the blend may be in the form of nanocrystalline catalyst particles adhered directly to the diamond particles made by any method known now or hereafter to one of ordinary skill in the art. In some embodiments, the source catalyst metal compounds may have an average particle size that is less than that of the diamond grains. In some embodiments, the source catalyst metal compounds may have an average particle size that is similar to that of the diamond grains.

The reduced catalyst metals may be present in varying amounts in the blend. In one embodiment, reduced catalyst metals of about 0.5% to up to about 10% by weight are contained in the diamond-cobalt blend. In some embodiments, the reduced catalyst metals may make up from about 1% to about 10% of the blend by weight of the blend. In other embodiments, the reduced catalyst metals may make up from about 0.5% to about 15% by weight of the blend. In other embodiments, the reduced catalyst metals may make up from about 1% to about 3% by weight of the blend.

Prior to being added to the diamond powder, the source catalyst metal compound is milled to produce fine sized material that will not agglomerate and will attach readily to diamond. It is suitable to use cobalt oxalate dihydrate as the source catalyst metal compound as it is more brittle than a cobalt metal catalyst and will yield a finer particle after milling. Suitable size ranges of source catalyst metal compound particles include sizes from about 0.001 to about 1 micron, about 0.01 to about 5 microns and about 0.1 to about 0.3 microns.

The source catalyst metal compound may be pre-milled separately from the diamond to reduce the size of the source catalyst metal compound particles and to disperse the particles. Pre-milling may be done in a ball mill, attritor mill, or any similar device that provides impact energy to the catalyst powder. The pre-milling may be done dry or wet with a carrier liquid that does not react with or bond to the catalyst. Milling media may be any of the standard types of hard materials such as WC/Co, alumina, SiC, or other hardmetal or ceramic that does not react with or bond to the catalyst.

The pre-milled source catalyst metal compound is then added to the diamond particulate and blended to produce a diamond-source catalyst metal compound blend. Blending may be done in a ball mill, attritor mill, or any similar device that provides impact energy to the blend. The blending may be done dry or wet with a carrier liquid that does not react with or bond to the catalyst or diamond. Blending media may be any of the standard types of hard materials such as WC/Co, alumina, SiC, or other hard metal or ceramic that does not react with or bond to the catalyst or diamond.

In an embodiment where cobalt oxalate dihydrate is used as the catalyst metal source, the diamond-cobalt oxalate blend is heated at a temperature sufficient to calcine the cobalt oxalate dihydrate. Typically the calcination step is performed at temperature ranges from about 275° C. up to about 375° C. in a furnace at atmospheric conditions. During calcination, the cobalt oxalate dihydrate decomposes to form to cobalt oxide, carbon dioxide and water. In this embodiment, the reduced blend is further heated to reduce the cobalt oxide to metallic cobalt. Temperatures may range from about 800° C. to about 1200° C. for about 30 minutes to about 2 hours. Heating may be conducted in a hydrogen atmosphere. Optionally, one heating step may be used instead of a two-step process.

In embodiments where other source catalyst metal compounds are used, it may only be necessary to treat the blend, prior to sintering, using techniques known in the art such as heating the blend in a vacuum.

FIG. 1 shows a Scanning Electron Micrograph (SEM) of the reduced diamond-catalyst blend 100, prior to HPHT sintering, which may be used in an embodiment of the present invention. In FIG. 1, 0.8 μm mean volumetric size diamond particles 110 have less than 150 nanometers (nm) average size cobalt particles 120 adhered to their surfaces.

Figure 2A:
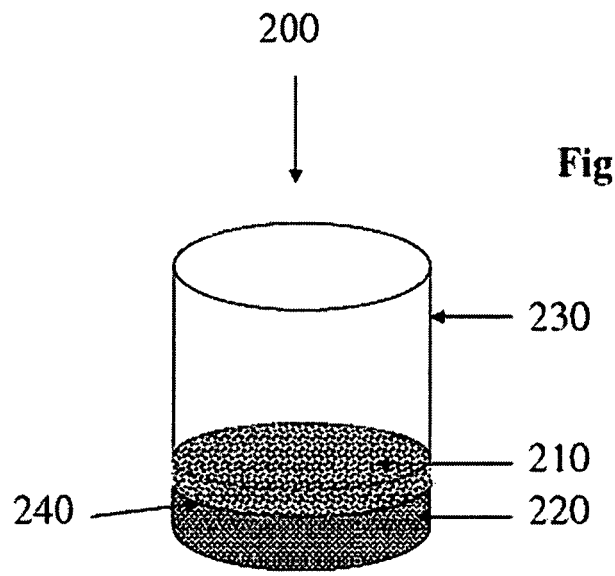
FIGS. 2A and 2B illustrate a process for making the supported submicron PCD body.
Figure 2B:
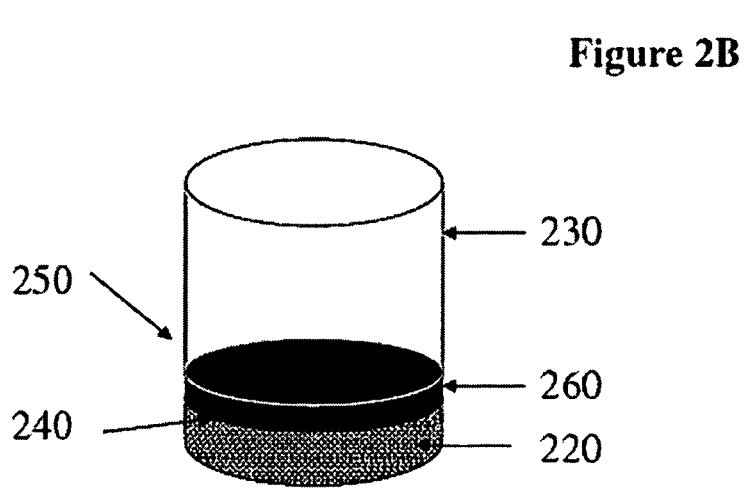
Figure 3:
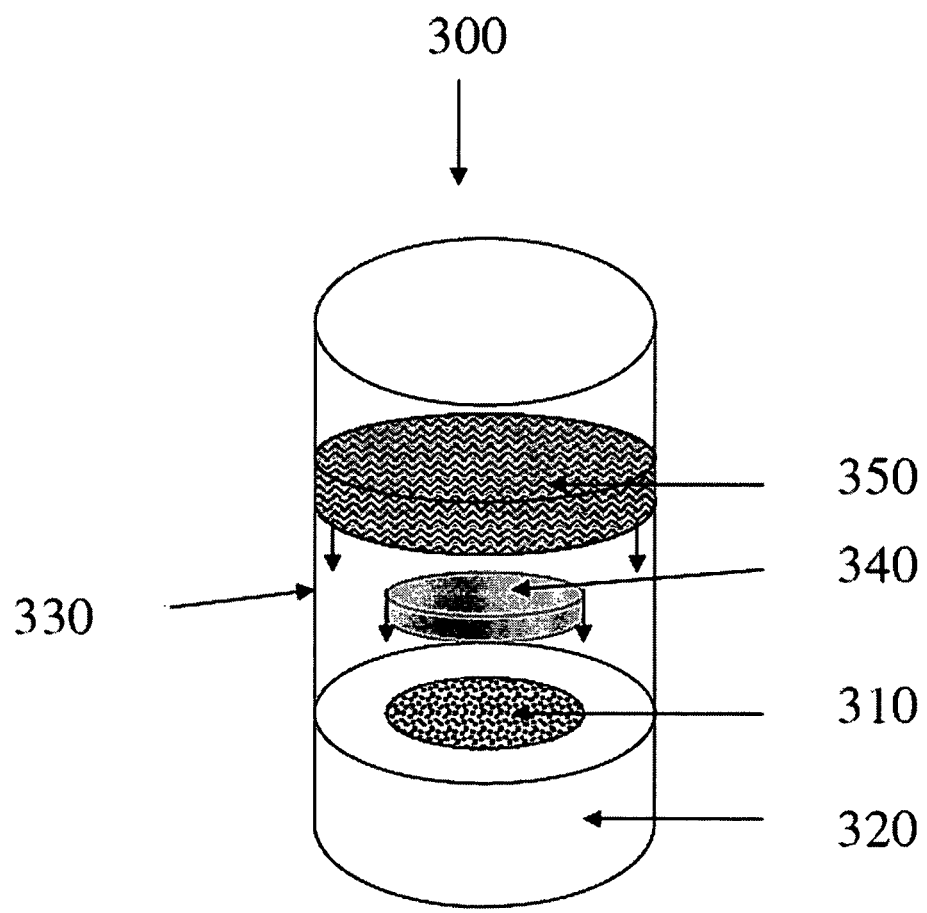
FIG. 3 illustrates a process for making carbide supported wire die blanks.

The diamond-catalyst blend is then processed as described. FIGS. 2A and 2B represent a process of making a supported submicron PCD body. FIG. 2A refers to the system before HP/HT processing 200. FIG. 2B refers to the HP/HT processed supported submicron PCD body 250. In an embodiment of FIG. 2A, a reduced diamond-catalyst blend 210 (described above) and a cemented metal carbide support 220 may be disposed in a protective enclosure 230. The reduced diamond-catalyst blend 210 and the metal carbide support 220 may be sintered simultaneously in a single HP/HT process. In an embodiment, the metal carbide support 220 reacts only with a layer of diamond particles at the interface 240 with the metal carbide support, to adhere the resultant PCD body to the support. The resulting product 250 is a sintered PCD body 260 adhered to a metal carbide support 220. The PCD body 260, comprises diamond to diamond bonds. The product 250 is subsequently removed from the protective enclosure 230. It should be understood that the methods described herein can be used to make a monolithic (i.e., unsupported) structure. In such a case, the method shown in FIGS. 2A and 2B could be used, without the support 220.

The HP/HT processing conditions selected are sufficient to provide intercrystalline bonding between adjacent diamond grains and, optionally, the joining of sintered diamond particles to the cemented metal carbide support. In one embodiment, the processing conditions generally involve the imposition for about 3 to about 120 minutes of a temperature of at least 1000° C. and a pressure of at least 20 kilobars (kbar). In another embodiment, pressures between about 50 and about 80 kbar and temperatures between about 1400° C. and about 1600° C. may be used. Other temperatures and pressures are possible. Pressures, temperatures, and process duration are selected to minimize diamond grain growth during sintering and may be now or hereafter known to one of skill in the art. Temperatures and pressures described herein are approximate.

In yet another embodiment, the reduced diamond-catalyst blend may be sintered in an HP/HT process without the metal carbide support. A subsequent HP/HT or brazing process may be used to attach a cemented metal carbide support.

In yet another embodiment, the metal carbide support may be an annulus and the mass of reduced diamond-catalyst blend) may be disposed within the support annulus such as a wire die. These may be sintered together in the HP/HT process with or without the addition of additional catalyst.

The disclosure contained herein relates to sintered PCD with improved strength and toughness in machining, for example, non-ferrous metals, ceramics, and wood-based composites. In addition, it relates to improved machinability during fabrication of wear components such as PCD machining tools, wear pads, punches, and dies. Finally, it relates to the ability of such tools to give an improved surface finish on workpieces, including, for example, aluminum castings or steel wire. Tools as described herein may include, for example, monolithic sintered PCD, a sintered PCD layer bonded to a substrate (such as one of a cemented metal carbide, such as cemented tungsten carbide or other material), and sintered PCD inside an annulus of cemented metal carbide such as cemented tungsten carbide or other material as would be used in wire drawing.

In the commercial production of PCD in general, it is common for the product or blank which is recovered from the reaction cell of the HP/HT apparatus to be subjected to a variety of finishing operations which include cutting, such as by electrode discharge machining or with lasers, milling, and especially grinding to remove any adherent shield metal from the outer surfaces of the compact. Such operations additionally may be employed to machine the compact into a shape which meets product specifications as to diamond layer thickness and/or carbide support thickness.

In the resulting PCD body, the average, as-sintered diamond grain size measured by the line intercept method may be less than one micron. It may also be greater than about 0.1 μm. In various embodiments, the average grain size may be less than about 0.9 μm, less than about 0.8 μm, less than about 0.7 μm, less than about 0.6 μm or less than about 0.5 μm. The PCD body may be substantially uniform. These embodiments, based on symmetrical normal grain size distributions, may contain about 50%, about 63%, about 77%, about 90%, about 98% and about 100% of the diamond grains below about 1 μm. Other embodiments may have other ranges.

The PCD bodies contained herein may have thicknesses (i.e., top surface to substrate interface) of about 0.5 millimeters (mm) to about 1 mm, up to about 1.5 mm, greater than 1 mm, up to about 2 mm, or another size.

As used herein, bodies having a "uniform" grain size or a "substantially uniform" grain size are intended to encompass bodies where the average grain size is less than about 1 micron, meaning that more than about 50% of the particles are below about 1 μm after sintering.

Figure 4:
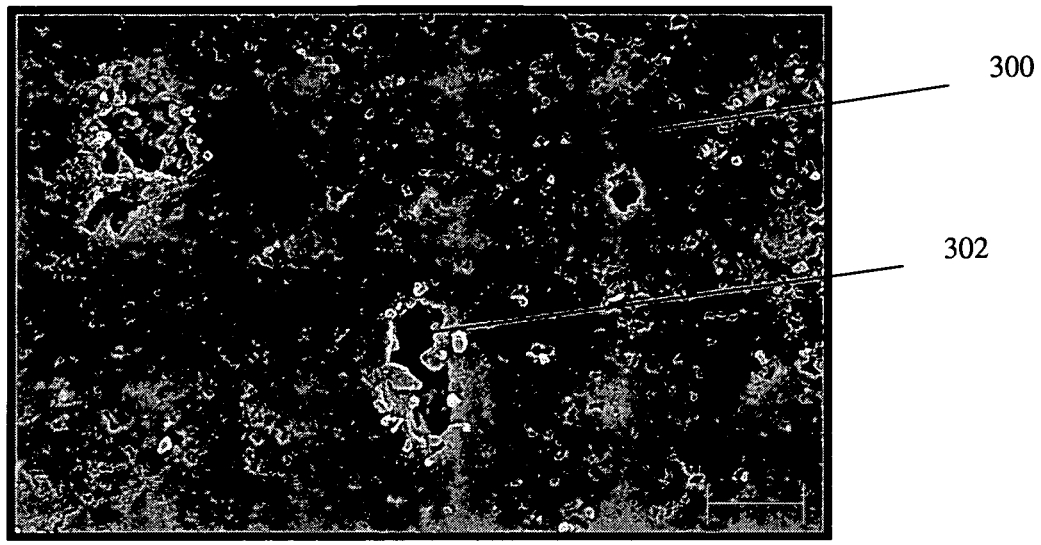
FIG. 4 is an SEM image of a polished and leached PCD body made from a cobalt-diamond powder blend with pure cobalt metal as the source catalyst metal compound.

FIG. 4 is a comparative SEM image of a leached PCD body produced using standard cobalt metal powder as the source catalyst metal compound. As shown in FIG. 4, the PCD body 300 includes large pits 302 resulting from the cobalt metal powder being unevenly distributed in the diamond-cobalt blend prior to HPHT sintering. The pore sizes in FIG. 4 were measured using the line-intercept method. The maximum pore size observed was about 5.2 microns with a range of from about 0.045 microns up to about 5.2 microns, with a pore size average of 0.417 microns and standard deviation of about 0.865 microns.

Figure 5:
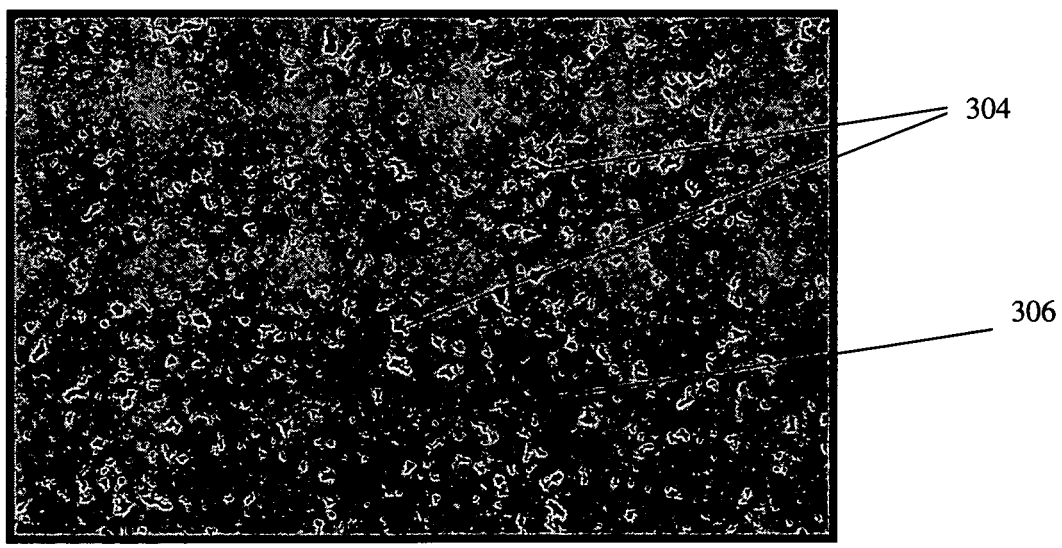
FIG. 5 is an SEM image of a polished and leached PCD body made from a cobalt oxalate dihydrate-diamond powder blend of the present invention.

FIG. 5 is an SEM image of a PCD body of the present invention that has been leached of cobalt. As shown in FIG. 5, the pores 304 are finer and more evenly distributed in the PCD body 306. This is a result of using cobalt oxalate dihydrate as the source catalyst metal compound according to the process of the present invention. The pore sizes in FIG. 5 were measured using the line-intercept method. The maximum pore size observed was about 1.5 microns with a range of from about 0.027 microns to about 1.2 microns, with a pore size average of 0.138 microns and standard deviation of 0.14 microns.

Figure 6:
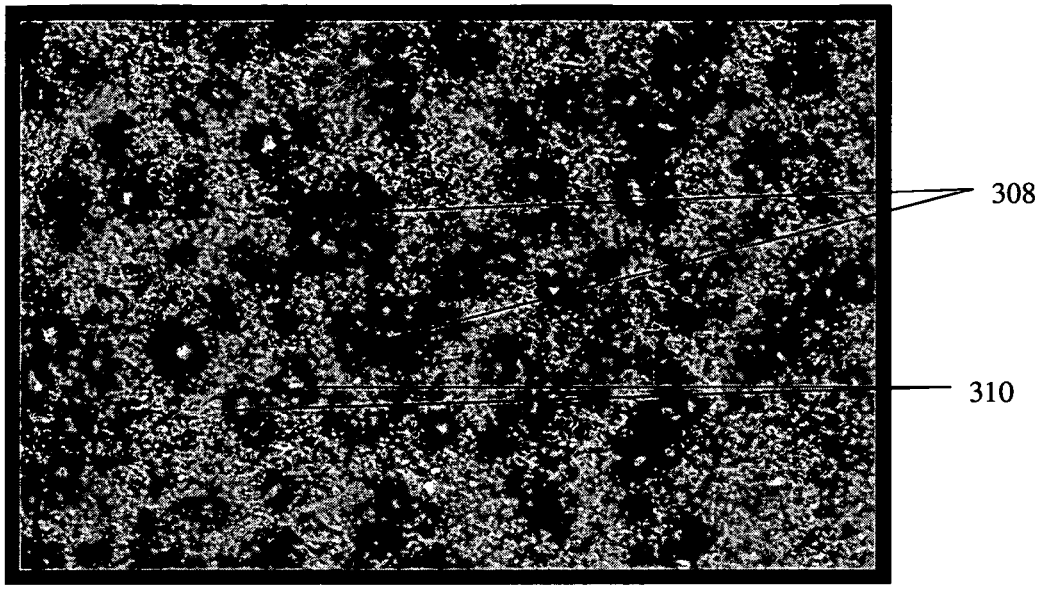
FIG. 6 is an SEM image of a polished metal filled, unleached PCD body made from cobalt-diamond powder blends with pure cobalt metal as the source catalyst metal compound.

FIG. 6 is a comparative SEM image of sintered, unleached PCD produced using standard cobalt metal powder as the source catalyst metal compound. As shown in FIG. 6, the PCD 308, predominantly grey areas, includes large cobalt agglomerates, predominantly white areas, 310 resulting from the cobalt metal powder being unevenly distributed in the diamond-cobalt blend after HPHT sintering.

Figure 7:
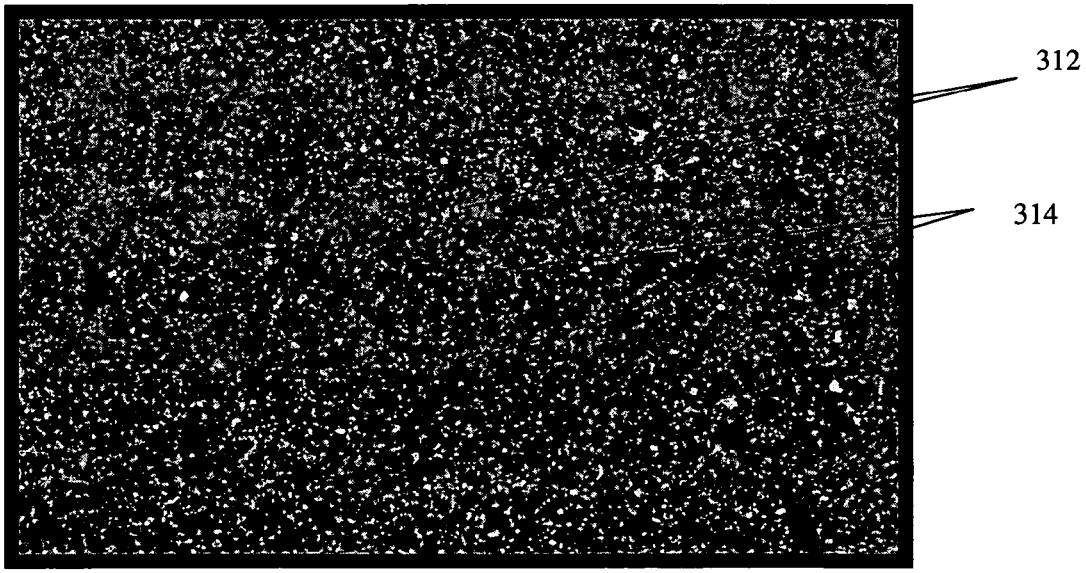
FIG. 7 is an SEM image of a polished metal filled, unleached PCD body made from a cobalt oxalate dihydrate-diamond powder blend of the present invention.

FIG. 7 is an SEM image of a sintered, unleached, polished PCD sample of the present invention. As shown in FIG. 7, an even distribution of the cobalt, predominantly white areas, 312 in the PCD, predominantly grey areas, 314 is shown. This is a result of using cobalt oxalate dihydrate as the source catalyst metal compound according to the process of the present invention.

Advantages of the present invention include reduced cracking in the final PCD product and an improved yield. Further, it has been found that wear rates of PCD bodies of the present invention are decreased. These advantages are a result of using a brittle source catalyst metal compound, such as cobalt oxalate dihydrate, that may be broken down into a fine size. Use of a fine-sized source catalyst metal compound allows for superior, uniform distribution of the source catalyst metal compound in the diamond-source catalyst metal compound blend. Further, after sintering, the reduced catalyst is evenly distributed throughout the PCD body resulting in less, or the absence of, pits in the sintered, leached PCD body.

Addition of a cobalt compound, such as cobalt oxalate dihydrate, to the diamond powder, varying from 0.1% to 15% by weight of the diamond powder or 0.5% to 50% of the total cobalt catalyst in the PCD body after HPHT sinter, which, after thermochemical reduction, acts as a catalyst to facilitate infiltration of cobalt catalyst. As such, using extreme temperatures and pressures to produce submicron PCD is not necessary.

Another advantage of using a cobalt compound, such as cobalt oxalate dihydrate, to manufacture a PCD body is that the compound is soluble (or at least highly wettable) and thus easily de-agglomerated in the majority of organic milling fluids, including but not limited to isopropyl alcohol, that wet diamond well. Another advantage of the present invention is that the use of a brittle compound, such as cobalt oxalate dihydrate, can be easily de-agglomerated and the particle size reduced by milling. By comparison, cobalt metals can agglomerate in the mill and lead to large pits (see FIG. 4) in the PCD body.

As discussed above, some embodiments contain a cobalt-containing substrate or support, i.e., a cemented metal carbide support, formed by cementing together tungsten carbide particles in a cobalt binder matrix. During ultra hard material sintering, the cobalt in the substrate is "squeezed" or swept from the carbide substrate and infiltrates the diamond. An advantage to using a compound, such as cobalt oxalate dihydrate, is that after the compound is reduced to cobalt, as described above, the resulting cobalt particles adhere to the diamond forming a discontinuous coating (see FIG. 1). During routine handling, the cobalt particles will not separate from the diamond particles and, during subsequent catalyst infiltration by sweeping, the reduced cobalt particles will not be "swept" off of the diamond. Further, after reduction of the cobalt oxalate dihydrate to cobalt, the cobalt particles have a high melting point and higher purity than any subsequent infiltration catalyst.

Yet another advantage to using a compound, such as cobalt oxalate dihydrate, in accordance with the present invention is that it is not easily oxidized for corroded and will not rust during routine handling.

EXAMPLES

Examples are provided herein to illustrate various embodiments but are not intended to limit the scope of the invention.

Example 1

Referring again to FIGS. 2A and 2B, this example demonstrates the ability to make PCD composites in which the sintered diamond is integrally bonded to a cemented metal carbide substrate. A diamond-cobalt oxalate dihydrate powder blend with approximately 2.5 cobalt metal by weight, distributed as shown in FIG. 1 with approximately 0.8 microns volumetric mean raw material diamond size 210, was disposed between a tantalum (Ta) shielding enclosure 230 and a cemented tungsten carbide (WC)+13 weight-percent cobalt disk.

This assembly was subjected to HP/HT processing at about 65 Kbar at temperature of about 1400° C. for 10 minutes to form the sintered submicron PCD tool blank 260. The PCD tool blank 250 was finished to produce a diamond layer 260 1.5 mm thick, and the overall thickness of the blank 250 was 3.2 mm. The average as-sintered diamond grain size, assessed by direct line intercept measurement of the microstructure with a field emission scanning electron microscope, was 0.87 μm. Several variations of this process were made using differing initial diamond powder sizes, diamond layer thicknesses, and cobalt blend amounts. Table 1 shows the compositions and test results for samples made with the new process and variations involving the catalyst.

TABLE 1

| Sample | Catalyst | Wt % metal catalyst in blend | Pre-milling of catalyst | % Cobalt in PCD | % Tungsten in PCD | Wear Rate (mg/min) |
|---|---|---|---|---|---|---|
| A | Cobalt oxalate dihydrate | 2.5 | Yes | 15.6 | 5.5 | 0.24 |
| B | Cobalt metal | 5 | No | 34.0 | 0.03 | NA |
| C | None | 0 | No | 21.8 | 4.2 | 2.48 |
| D | Cobalt oxalate dihydrate | 5 | No | 20.4 | 2.9 | 0.80 |
| E | — | — | — | 20.4 | 12.7 | 1.09 |

Sample A is a PCD body that was processed by method of the present invention described above. An image of the microstructure for Sample A is shown in FIG. 5. Sample B is a PCD body that was processed using cobalt metal powder (5% by weight metal), 0.8 micron average diamond particle size. An image of the microstructure for Sample B is shown in FIG. 4. Blend processing and sintering were performed using the same conditions as above. The microstructure produced by the method of the present invention (Sample A) shows improved homogeneity compared to the microstructure of Sample B.

Example 2

In this example, the properties of several PCD bodies (Samples A-D) prepared with diamond powder of 0.8 micron volumetric mean size and a competitor PCD body, marketed as having a 1 micron diamond grain size, are compared. Sample A is identical to the description outlined in Example 1. Sample C was prepared using the same process as Sample A but without blending the diamond powder with a source catalyst metal compound.

Sample D refers to a PCD body prepared using the same process as Sample A but using cobalt oxalate dihydrate that was not pre-milled. In this case, the volumetric mean size of the cobalt oxalate dihydrate blended with the diamond was about 2.8 microns. A blast wear test was employed to test the quality of PCD. In the blast wear test, SiC media (average grain size 145 microns) was carried through a nozzle (having a diameter of 6.5 mm) by air pressure (about 60 psi) to impact a 16 mm diameter sample of PCD at a distance of 8 cm. The sample was held at a 90 degree angle to the nozzle. The sample was then subjected to the high pressure stream of the SiC media for 30 seconds. Weight loss was then measured and converted into a wear rate (mg/min). PCD bodies of the present invention exhibited cobalt contents of less than about 20% and wear rates (mg/min) of less than 1.

Although obviously not as hard as diamond, the SiC media impacts the PCD, introducing defects until pieces can break away. This is directly linked to the quality and degree of sintering of the PCD part. Analysis of the samples is shown in Table 1 which compares wear rate and metal content. Sample A, prepared according the present invention method, shows an improved abrasive wear rate and reduced metal content compared the other samples.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for producing a polycrystalline diamond (PCD) body with an arithmetic mean as-sintered grain size less than 1 µm, comprising:

providing diamond particles having a volumetric mean particle size of less than about 1.0 µm and greater than about 0.1 µm;

blending, with the diamond particles, a source catalyst metal compound selected from the group of cobalt oxalate dihydrate, cobalt acetate, cobalt boride, cobalt citrate dihydrate, cobalt hydroxide, cobalt isopropoxide, cobalt pentanedionate, and dodecacarbonyltretracobalt to form a diamond powder blend; and processing the diamond powder blend using a pressure and a temperature for a time sufficient to cause intercrystalline bonding between adjacent diamond grains.

2. The method of claim 1, wherein the source catalyst metal compound comprises up to about 50% by weight of the diamond powder blend.

3. The method of claim 1, wherein the source catalyst metal compound comprises nanocrystalline particles.

4. The method of claim 1, wherein the pressure is between about 20 Kbar and 80 Kbar, and wherein the temperature is at least about 1000° C., for up to about 120 minutes.

5. The method of claim 1, further comprising processing the diamond powder blend together with a cemented metal carbide support.

6. The method of claim 1, wherein the metal carbide support comprises a support annulus and the diamond power blend is disposed within the support annulus.

7. A method for producing a polycrystalline diamond (PCD) body with an arithmetic mean as-sintered grain size less than 1 µm, comprising:

milling a source catalyst metal compound selected from the group of cobalt oxalate dihydrate, cobalt acetate, cobalt boride, cobalt citrate dihydrate, cobalt hydroxide, cobalt isopropoxide, cobalt pentanedionate, and dodecacarbonyltretracobalt;

providing diamond particles having a volumetric mean particle size of less than about 1.0 µm and greater than about 0.1 µm;

blending, with the diamond particles, said source catalyst metal compound wherein said catalyst has an average particle size that is less than that of the diamond grain size, to form a diamond powder blend;

heating said diamond powder blend; and processing the diamond powder blend using a pressure and a temperature for a time sufficient to cause intercrystalline bonding between adjacent diamond grains.

8. The method of claim 7, wherein said milling step comprises a carrier liquid.

9. The method of claim 7, wherein the temperature of said heating step is between about 500° C. to about 1200° C.

10. The method of claim 7, wherein said step of heating said diamond powder blend further comprises reducing said source catalyst metal compound to a reduced catalyst metal.

11. The method of claim 7, wherein said method for producing a polycrystalline diamond (PCD) body with an arithmetic mean as-sintered grain size less than 1 µm further comprising a second heating step after said heating step.

12. The method of claim 10, wherein the reduced catalyst metal comprises about 0.5% to about 5% by weight of the diamond powder blend.

13. The method of claim 12, wherein the reduced catalyst metal comprises about 1.0% to about 3% by weight of the diamond powder blend.

* * * * *